United States Patent
Smith et al.

(10) Patent No.: US 9,671,994 B2
(45) Date of Patent: Jun. 6, 2017

(54) DIDACTIC INFORMATION PORTAL SYSTEM

(71) Applicant: Cubic Corporation, San Diego, CA (US)

(72) Inventors: Gavin R. Smith, Crawley (GB); Steffen Reymann, Reigate (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/099,097

(22) Filed: Apr. 14, 2016

(65) Prior Publication Data

US 2016/0306604 A1    Oct. 20, 2016

Related U.S. Application Data

(60) Provisional application No. 62/147,499, filed on Apr. 14, 2015.

(51) Int. Cl.
*G06F 3/00* (2006.01)
*G06F 3/14* (2006.01)
(Continued)

(52) U.S. Cl.
CPC ............. *G06F 3/1454* (2013.01); *G01W 1/00* (2013.01); *G06F 3/013* (2013.01); *G06F 3/041* (2013.01);
(Continued)

(58) Field of Classification Search
CPC .. G06F 17/3087; G06F 9/4446; G06F 3/0481; G06F 9/4443; G06F 17/30241
(Continued)

(56) References Cited

U.S. PATENT DOCUMENTS

2004/0225647 A1* 11/2004 Connelly .......... G06F 17/30864
2010/0121866 A1   5/2010 Bell et al.
(Continued)

FOREIGN PATENT DOCUMENTS

WO       2014/000250 A1    1/2014

OTHER PUBLICATIONS

International Search Report and Written Opinion mailed Jun. 15, 2016 for International Application No. PCT/US2016/027559, filed Apr. 14, 2016; all pages.
(Continued)

*Primary Examiner* — Haoshian Shih
(74) *Attorney, Agent, or Firm* — Kilpatrick Townsend and Stockton, LLP

(57) ABSTRACT

A method of updating a didactic information display includes providing information for display on a number of interactive information devices. The method includes receiving and aggregating data related to interactions from users of the number interactive information devices. The data includes a location and a timestamp associated with each of the interactions. Each of the interactions is related to a subset of the information displayed on one of the number of interactive information devices. The method includes determining a most relevant subset of the information for a plurality of sets of parameters and determining a current set of parameters from the plurality of sets of parameters. The method includes communicating a command to a passive display device located remotely from the number of interactive information devices. The command may cause the passive display device to display the most relevant subset of the information based on the current set of parameters.

17 Claims, 5 Drawing Sheets

(51) Int. Cl.
*G01W 1/00* (2006.01)
*G06F 3/01* (2006.01)
*G06F 3/041* (2006.01)
*G06F 3/16* (2006.01)
*G09B 5/02* (2006.01)
*G06Q 30/02* (2012.01)

(52) U.S. Cl.
CPC ............... *G06F 3/167* (2013.01); *G09B 5/02* (2013.01); *G06Q 30/0251* (2013.01)

(58) Field of Classification Search
USPC ......... 715/705, 745; 707/224, 749, 748, 758
See application file for complete search history.

(56) References Cited

U.S. PATENT DOCUMENTS

2013/0007665 A1* 1/2013 Chaudhri ............. G06F 9/4443
715/830
2015/0286936 A1* 10/2015 Furuya ................ B61L 27/0027
706/58

OTHER PUBLICATIONS

Wikipedia; "Eye tracking"; Mar. 31, 2015; Retrieved from the Internet: <https://en.wikipedia.org/w/index.php?title=Eye_tracking&oldid=654361001>.

* cited by examiner

DIDACTIC INFORMATION PORTAL SYSTEM

CROSS-REFERENCES TO RELATED APPLICATIONS

This Application claims priority to U.S. Provisional Patent Application No. 62/147,499 filed Apr. 14, 2015, entitled "DIDACTIC INFORMATION PORTAL SYSTEM," the entire disclosure of which is hereby incorporated by reference, for all purposes, as if fully set forth herein.

BACKGROUND OF THE INVENTION

Traditional information displays are tuned to show content based on manually configured parameters. Operational staff decide what should be displayed and for how long and then configure the system present the information in the desired manner. The decisions regarding what should be displayed and for how long are made using human decisions and probably little more than educated guesses.

BRIEF SUMMARY OF THE INVENTION

The current invention relates generally to didactic information portal systems that record and analyze interactions made at interactive information portals to learn the preferences of end users with regards to the content provided by these portals. Embodiments can utilize these preferences, along with parameters associated with the preferences, such as time, location, weather, local incidents, etc. to create a database of preferred content and make those preferences available to non-interactive information displays such that they will better provide the most likely desired information without user intervention.

In one aspect, a method of updating a didactic information display is provided. The method may include providing information for display on a number of interactive information devices. The method may also include receiving and aggregating data related to interactions from users of the number interactive information devices. The data may include a location and a timestamp associated with each of the interactions. Each of the interactions may be related to a subset of the information displayed on one of the number of interactive information devices. The method may further include determining a most relevant subset of the information for a plurality of sets of parameters and determining a current set of parameters from the plurality of sets of parameters. The method may include communicating a command to a passive display device located remotely from the number of interactive information devices. The command may cause the passive display device to display the most relevant subset of the information based on the current set of parameters.

In another aspect, a non-transitory computer-readable medium having instructions embedded thereon for updating a didactic information display is provided. The instructions may include computer code for causing a computing device to provide information for display on a number of interactive information devices. The instructions may also include computer code for causing a computing device to receive and aggregate data related to interactions from users of the number interactive information devices. The data may include a location and a timestamp associated with each of the interactions. Each of the interactions may be related to a subset of the information displayed on one of the number of interactive information devices. The instructions may further include computer code for causing a computing device to determine a most relevant subset of the information for a plurality of sets of parameters and to determine a current set of parameters from the plurality of sets of parameters. The instructions may include computer code for causing a computing device to communicate a command to a passive display device located remotely from the number of interactive information devices. The command may cause the passive display device to display the most relevant subset of the information based on the current set of parameters.

In another aspect, a didactic information system is provided. The system may include a communications interface configured to communicate with a number of interactive information devices and at least one passive display device. The system may also include a memory and a processor. The processor may be configured to provide, using the communications interface, information for display on the number of interactive information devices. The processor may also be configured to receive and aggregate data related to interactions from users of the number interactive information devices. The data may include a location and a timestamp associated with each of the interactions. Each of the interactions may be related to a subset of the information displayed on one of the number of interactive information devices. The processor may be further configured to determine a most relevant subset of the information for a plurality of sets of parameters and to determine a current set of parameters from the plurality of sets of parameters. The processor may be configured to communicate, using the communications interface, a command to the at least one passive display device located remotely from the number of interactive information devices. The command may cause the passive display device to display the most relevant subset of the information based on the current set of parameters.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
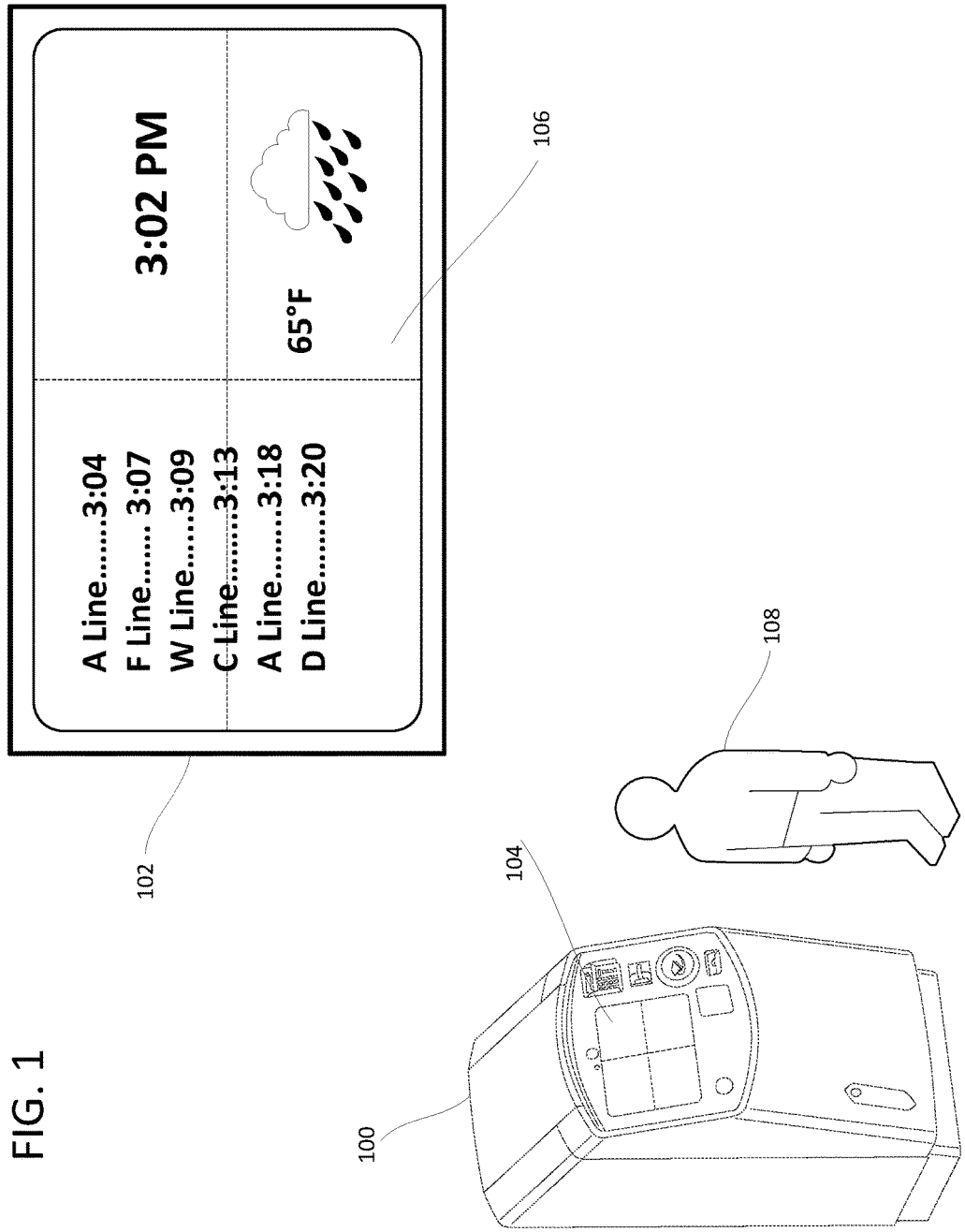
FIG. 1 depicts an interactive information device and a passive display device according to embodiments.

The current invention relates generally to interactive information portals (such as touchscreens, websites, etc.) related to transit systems, although embodiments and applications are not so limited. For example, the systems and methods described herein may be utilized in non-transit applications, such as movie theaters, airports, billboards, mall directories, and other applications where information is displayed on passive devices. Embodiments of the present invention are directed toward a didactic information portal system that measures factors of the human interplay at interactive information portals to learn the preferences of end users with regards to the content provided by these portals. Factors can include content selection, viewing/interaction duration, screen flow etc. Embodiments can combine these measures with other pertinent variables such as time, location, weather, local incidents, and the like to create a database of preferred content and make those preferences available to both interactive and non-interactive (passive) information displays such that they will better provide the most likely desired information without user intervention.

In contrast to conventional systems that rely on manually configured content, embodiments of the invention include interactive displays that can teach a dumb or passive display what to display based on usage patterns. In some embodiments, the system may gather statistics regarding which content options are selected for viewing or otherwise accessing on interactive information screens, how long particular content is viewed, how content is resized or repositioned on the display, and which content normally precedes or follows the content, and/or other interaction data. This data is gathered from across the fleet of interactive displays and aggregated to create a blueprint for how content should be delivered to a fleet of passive displays connected to the same content management system.

Embodiments of the invention can include the use of locally measured user interaction patterns from active touchpoints to automatically drive content of passive displays. In some embodiments, a continually refined database of learned content may be made available to both active touchpoints and passive displays. In some embodiments, direct user interaction data may be combined with external variables to refine learned content database. Further embodiments of the invention result in operators no longer having to configure the content management systems for passive displays. In some embodiments, end users reading the passive displays are much more likely to see the content they need, for the right amount of time and in the right order. In some embodiments, content on active touchpoints (interactive devices) is also continually refined for users.

Embodiments of the invention provide systems and methods for providing real-time updates of information relevant to users, without requiring any real-time or recent user interactions with a display device. These systems and methods addresses the challenge of alerting patrons with time sensitive information, such as transit tables, event information, weather information, and the like, without the user actively requesting triggering the data. This is addressed by transmitting the information over a wired and/or wireless communication channel to activate a passive display device, which causes the updated information to be presented on the passive display device and enables the connection of the passive display device to the data source, such as a transit system computer over a network such as the Internet. In some embodiment, the information is directed to the desired passive display device and/or interactive information device using a device identifier, such as an IP address or other communication delivery address. As discussed below, the information may be communicated based on a transmission schedule, such as at predetermined intervals or times, and/or may be transmitted based on some other triggering event.

Turning now to FIG. 1, an interactive information device 100 and a passive display device 102 are shown. Interactive information device 100 may be a vending machine configured to issue products, such as transit fare products. Interactive information device 100 may also be an information kiosk, such as a kiosk that provides maps of a transit system, timetables for transit vehicles, advertisements, information on businesses and events proximate to a transit station, weather, disruption data, and/or other information in an interactive format. For example, a user may approach a kiosk and navigate a menu provided on a user interface of the kiosk to select relevant information for display on the kiosk. Oftentimes, a user may not wish to use an interactive information device 100 to get information, as they may just desire general information, do not wish to wait in line to use an interactive information device 100, and/or have another reason for not wishing to use the display. Transit systems, such as bus and train systems, often include one or more passive display devices 102 positioned around terminals or stations of the transit system. Passive display devices 102 may include display screens mounted on walls or other stationary structures, as well as displays that may be mounted on an interior and/or exterior of transit vehicles such as busses and trains. Similar devices may be provided in airports and other high traffic areas. Passive display devices 102 may be used to provide quick access to information of general relevance. The displays may reduce lines at interactive information devices 100 as well as generally help increase the flow of patrons of a transit system by presenting useful information from far away at an easily viewed location. For example, passive display devices 102 often include very large display screens (some being several feet or more in length) and are typically elevated to a position sufficiently high that most people are able to view the displays without having their sightline obstructed by other people and/or objects. A graphical interface of passive display device 102 and/or the interactive information device 100 may be divided into one or more sections, such as quadrants 104 on interactive information device 100 and quadrants 106 on passive display device 102. While shown here with quadrants, it will be appreciated that the displays may have fewer or more sections and/or may have no preset section boundaries.

A user 108 may interact with the interactive information device 102. The interactions of the user may be monitored and recorded by the interactive information device 102. For example, screen touches or other interactions with physical input devices, such as a keypad or other buttons may be recorded for each user, along with a corresponding effect on the user interface or set of information. For example, if user 108 touches a timetable icon to view timetables at a transit station, the interactive information device 102 may record the selection of the timetable icon. In such a manner, data can be collected that is used to determine what the most popular (commonly accessed)/utilized information or other resources are on at a particular interactive information device 100, transit station, or other location. Other than just recording screen touches and the like, the interactive information device 100 may include one or more image capturing devices, such as still and/or video cameras configured to monitor other user behavior. For example, a video camera may be used to monitor the user's gaze during the interactions with the interactive information device 100. Gaze information may be used for a number of reasons, such as determining a location on the graphical interface that is most often viewed, which content on a screen is viewed the most, a length of time that a user views a particular portion of the display and/or particular type of information, a most common sequence of viewing particular types of information, and the like. For example, gaze tracking may determine that most, or a significant number of users, look at timetable data first, followed by fare products and/or weather data. Additionally, the interactive information device 100 may log or record an amount of time each user spends on a particular screen of the graphical user interface. In some embodiments, the interactive information device 100 may be configured to receive voice commands and/or facilitate audio and/or video communications with a representative of a back office. A microphone of the interactive information device 100 may record the user's voice and dictation software may parse out commands from the recording. These commands may also be stored and maintained. All of the data may be used to determine most relevant information for users of the transit system. Oftentimes, the most relevant information will include most commonly accessed information for a particular set of parameters set of parameters or criteria.

Based on the relevant information, the passive display device 102 may be updated and commanded to present particular information in a particular format. As just one example, based on the interactions received at interactive information device 100, it may be determined that transit users most want to see a transit timetable, the current time, and the current weather, possibly in that order. It may also be determined that users most often view information from left to right, top to bottom. As a result, the passive display device 102 may be commanded to display current transit timetables on a left portion (or two quadrants 106) of the passive display device 102, while the current time and weather information are provided on a right portion of the passive display device 102.

Figure 2:
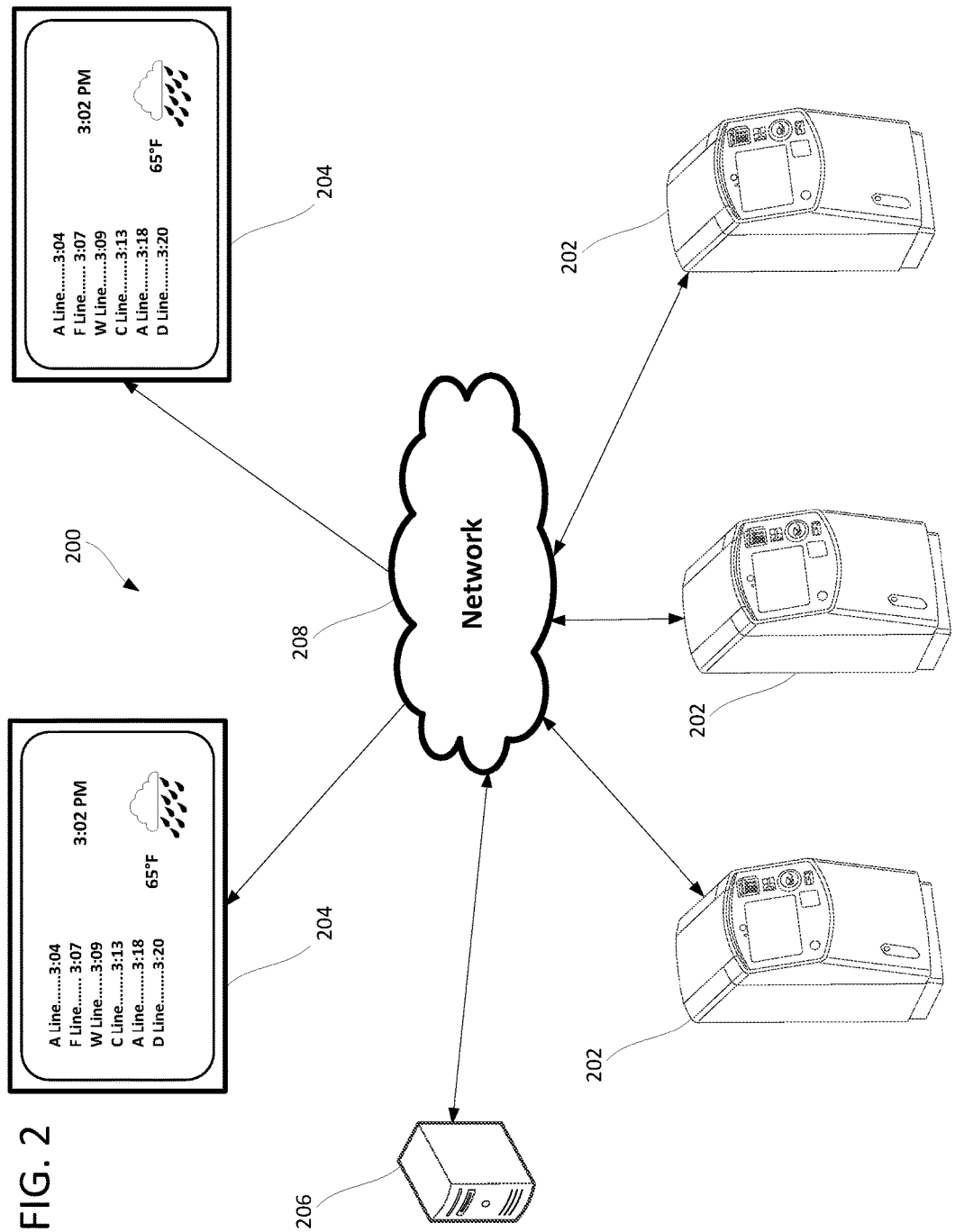
FIG. 2 depicts a system for updating a didactic information display according to embodiments.

FIG. 2 depicts one embodiment of a system 200 for updating a didactic information display. System 200 may include a number of interactive information devices 202 and/or passive display devices 204, which may each be similar to the interactive information devices and passive display devices described above with regard to FIG. 1. Data related to interactions may be collected by each of the interactive information devices 202 such as described above. This data, along with parameters associated with each of the interactions, may be sent to a central source 206, such as a transit back officer server, where it may be aggregated and analyzed to determine most commonly viewed or accessed information based on a variety of parameters. The parameters may include data such as a time of day of the interaction, day of the week of the interaction, an amount of time prior to the next departure and/or arrival of a transit vehicle at a particular location and/or interactive information device, disruption data, a current weather forecast or status, information about any special events within a particular proximity of the interactive information device 202, whether the interaction occurred on a particular holiday, as well as any other number of parameters that may be used to sort information collected from the various interactive information devices 202. The central source 206 may analyze the interaction data and parameters and calculate a set of most commonly accessed or most relevant data for users given a specific set of parameters. For example, it may be determined that whenever it is within a specific time threshold, such as 5 minutes, of a transit vehicle departure, users typically view transit timetables. As another example, the central source 206 may determine that on Sunday afternoons, when there is a baseball game being played nearby, that estimated times to arrive at a transit station most near the ballpark are the most commonly viewed content. Once the information and parameters are used to derive the set of most commonly viewed or most relevant data, the central source 206 may determine a current set of parameters at each of the interactive information devices 202 and/or each of the passive display devices 204. In some embodiments, each of the interactive information devices 202 and/or each of the passive display devices 204 may determine a current set of parameters and communicate these to the central source 206. In other embodiments, the central source 206 may determine the current parameters for each of the devices. The central source 206 may be in communication with one or more external sources (not shown), that enable the central source 206 to retrieve weather data, event data, and the like. The current set of parameters for one or more of the interactive information devices 202 may be different than for other devices. This may be due to different locations of the devices, which may result in different weather conditions and different scheduled departures and/or arrivals.

Once the current set of parameters are determined, the central source 206 may provide each of the interactive information devices 202 and/or each of the passive display devices 204 with a command to display the most common and/or relevant information for that particular interactive information device 202 and/or each of the passive display device 204. The relevancy of the information may be based on a combination of the current set of parameters and the interactions recorded at one or more particular interactive information devices 202. Most relevant information may include most commonly viewed or most commonly accessed information as recorded in the interactions. This may be based on the amount of time a particular screen is shown, the tracked gaze of the user, other interactions such as keystrokes and screen touches, and the like. Additionally, the most relevant information may be a set of transit fares or other products for purchase. In some embodiments, the set of transit fares or other products may be provided in order of most commonly viewed and/or most commonly purchased products. In some embodiments, the most relevant information may be different for an interactive information device 202 and a passive display device 204, even if the two devices are positioned near one another. For example, near a time of a transit vehicle departure, an interactive information device 202 may receive a command to display a set of most commonly purchased fare products (which may be based on the current set of parameters such as time of day, timetables, weather, location, and the like) while the passive display device 204 may receive a command to display other information, such as transit timetables.

The relevant information may also include a duration for showing each particular bit of data and/or a sequence of data in embodiments where a number of pieces of information are to be shown. As one example, it may be determined that the most relevant information for a particular set of parameters includes both an upcoming transit timetable, a weather report, and information related to a nearby public event, such as a sporting event start/end time and/or current status of the game (time in game and/or amount of game remaining). Based on the interactions, it may be determined that a largest percentage of transit system patrons want to see the timetables first, and afterwards check the weather report and/or the event information. The command sent to the interactive information device 202 and/or the passive display device may cause the receiving device(s) to display the timetable first, for a specified duration, before removing the timetable and displaying the current weather, weather forecast, and/or event information. Each set of information may have its own duration, which may reflect the relevance or percentage of patrons that utilize that information. In some embodiments, the command sent to the interactive information device 202 may be different than the command sent to the passive display 204 such that each device presents a unique set of information that is most useful to patrons. For example, the interactive information device 202 may present most commonly accessed or most relevant information to people needing to look up information and/or purchase fares, while the passive display device 204 presents general timetable information that is useful to most patrons. In one embodiment, an interactive information device 202 may present a timetable at an initial screen, which may then switch to a presentation of most popular transit products purchased at that location, at that particular time, and/or matching other parameters.

The current set of parameters may be matched to the stored parameters for identifying a set of most relevant information. The matching may include identifying stored parameters that are associated with one or more most common interactions. These stored parameters may be matched with an exact and/or approximate set of current parameters from the device(s). For example, a time threshold may be used to match parameters when a stored parameter time value is within 10 minutes of a time value of the current set of parameters. Weather information may be used to match parameters when a forecast and/or temperature values are within a certain number of degrees of a particular value. For example, if a stored parameter has a temperature value of 73° F. and a current temperature is 75° F., it may be determined that the temperature parameters match, as they are within 5° F. or other threshold. In some embodiments, a precipitation type and/or percentage may be used to match current and stored parameters, while in other embodiments, a forecast of partly cloudy, sunny, or snow showers may be used to match current and stored parameters. Any of these matches may be considered to be same weather data for the sake of retrieving most relevant information.

The parameters often are specific to a particular location. The location may be a particular transit station, where each of the passive display devices 204 and/or interactive information devices 202 at the particular station may be updated with the same and/or similar information. In other embodiments, the location may be a portion of a station. In such a case, the each device within the portion of the station may be updated with the same or similar information. In other embodiments, each device may receive individualized information based on interactions at that particular device.

In some embodiments, such as where the passive display devices 204 have very large display screens, the command received by the passive display device(s) 204 may include an arrangement of the most relevant information. The arrangement may direct the passive display device(s) 204 to present some or all of the most relevant information in a particular screen arrangement. For example, the content may be displayed with the most commonly accessed information presented on an upper left portion of the passive display device 204, with less relevant information displayed on an right and/or lower portion of the display. For example, the quadrant system shown in FIG. 1 may be used, or any other arrangement that displays the most relevant or most accessed information in a most prominently and/or most easily viewable portion of the passive display device 202. It will be appreciated that a display location for a particular piece of information on an interactive information device 202 may be different than a display location for the particular piece of information on a passive display device 204.

It will be appreciated that the command may include various combinations of data as presented herein. For example, a single command may include a set of relevant data based on a current set of parameters, a sequence indicating when to display each set of information, a duration of display for each set of information, an arrangement of a screen display, and/or other information.

Each interactive information device 202 and/or passive display device 204 may determine and communicate its current set of parameters to the central source 206 at different intervals. In some embodiments, the current set of parameters may be communicated at predetermined intervals, such as every 15 minutes. In other embodiments, the device(s) may constantly monitor the parameters and communicate a current set of parameters to the central source 206 any time a change in the parameters is detected. In other embodiments, the device(s) may be configured to communicate the current set of parameters based on a time relative to a particular event. For example, the device(s) may compare the current time to a transit timetable and/or a known local event. When the time reaches a certain threshold, such as 5 minutes before a transit vehicle departure, 15 minutes before an event, the arrival of a transit vehicle, and/or other event is starting within the threshold, the device(s) may transmit the current set of parameters to the central source such that the central source may determine a set of most relevant information and provide a command to the device(s) to display the most relevant information. It will be appreciated that other time thresholds and events may trigger the communication of a current set of parameters. In some embodiments, a combination of criteria, such as predetermined intervals, the occurrence of an event or time threshold, change of parameters and/or other information may be used to determine when the current set of parameters is communicated by a device to the central source 206. As just one example, each device may be configured to communicate the current set of parameters every 15 minutes, as well as when a transit vehicle is set to depart within a time threshold, such as 3 minutes. The parameters may also be communicated if the forecast changes, such as if it starts raining at the location.

In some embodiments, rather than the interactive information device 204 and/or passive display device 202 communicating the current set of parameters to the central source 206, the central source 206 may monitor the current set of parameters for each device itself. In some embodiments, this may include the central source 206 communicating with one or more third party systems, such as a weather system or local events database. Just as each device may communicate current parameters at specific times or upon the occurrence of a specific event, the central source 206 may communicate the most relevant information based on similar triggers.

The components of system 200, such as interactive information devices 202, passive display devices 204, and/or central source 206 may be communicatively interconnected using one or more networks 208. Network 208 may be a local area network (LAN) and/or other private or public wired and/or wireless networks. Network 208 may utilize one or more of Wi-Fi, ZigBee, Bluetooth™, Bluetooth™ Low Energy, a cellular communications protocol such as 3P, MG, or LTE, and/or any other wireless communications protocol. Network 208 may be communicatively coupled with one or more of the components of the system 200 to facilitate communication between the various components.

It will be appreciated that one or more different network connections may be used in accordance with the invention, and that the use of a single network 208 to enable communications is merely one example of such configurations. For example, each component may be communicatively coupled with other components using a separate network for one or more of the connections.

Figure 3:
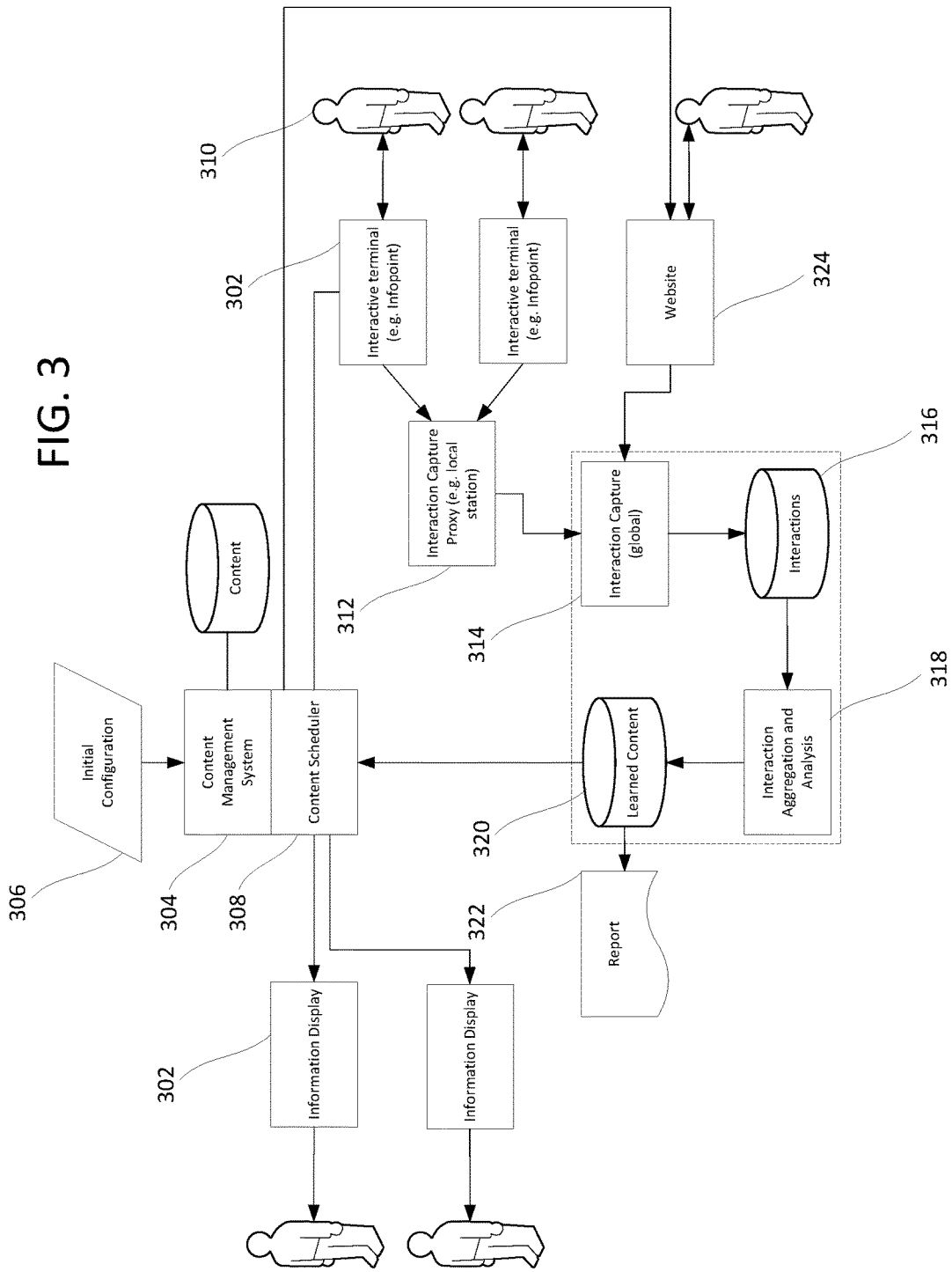
FIG. 3 is a flow diagram depicting a system for updating a didactic information display according to embodiments.

FIG. 3 shows a flow diagram of a system for updating display screens with didactic information. The system may include a number of passive display devices 300 and interactive information devices 302. A content management system 304 determines what type of content should be displayed on each of the passive display devices 300 and interactive information devices 302. Additionally, the content management system 304 may determine a duration of display of particular content, a location on a screen on which to display the content, an order of cycling through different content, and the like. An initial configuration 306 may be provided to the content management system 304. The initial configured may include settings for which content to display at a particular device, how long to display the content, and the like. In some embodiments, the initial configuration 306 may be programmed or otherwise determined by a human who makes a best guess as to the most efficient or relevant manner of displaying content. The initial configuration may be provided to the passive display devices 300 and/or interactive information devices 302 by a content scheduler 308.

Patrons 310 may interact with a number of the interactive information devices 302. In some embodiments, these interactions (screen touches, user gaze tracking data, keystrokes, and other interactions) may be captured and stored at a local level, such as at a station and/or device level. For example, interactions from each interactive information device 304 may be collected by a local transit station system 312 or computer, which may then transmit data about these interactions to a global information capture system 314, which collects and aggregates the interaction data. The interaction data may include information about each interaction, as well as a timestamp and other parameter data, such as weather information, event information, disruption data, and the like. The transmission of data may be done in batches at specified intervals and/or upon triggering events such as described in the discussion of FIG. 2. In some embodiments, the local transit station system 312 may be bypassed and the data may be communicated directly from each interactive information device 304 to the global information capture system 314. The interaction data may be stored in a central database 316 and may be analyzed by a central source computer 318. The analysis may be used to create learned content based on interactions (screen location, duration, order, most commonly accessed content, etc.). The learned content may include most commonly accessed or most relevant information based on one or more parameters, such as time of time, time to departure of a transit vehicle, weather, event information, and the like. This learned information may be stored in a learned content database 320 and passed to the content scheduler 308. The content scheduler 308 may then provide the learned content to the passive display devices 300 and/or the interactive information devices 302 upon receiving or otherwise determining a current set of parameters for each device or set of devices. For example, the content scheduler 308 and/or content management system 304 may determine a current set of parameters for a passive display device 300 and retrieve learned data associated with similar or matching parameters, which may be communicated to the passive display device 300. This learned content may replace some or all of the initial configuration 306 as the didactic system learns what the most relevant information or most commonly accessed information for various sets of parameters. Where this information is different than the initial configuration 306, the configuration may be changed and/or a new configuration may be generated by the content management system 304. In some embodiments, the learned content may also be included on a report 322. This report 322 may be used by a human representative to generate a new configuration, rather than having a new configuration generated by the content management system 304.

It will be appreciated that many of the components of the system of FIG. 3 may be a part of a central source, such as a transit server or other system as described in FIG. 2. For example, some or all of the content management system 304, the content scheduler 308, the interaction capture (global) 314, the interaction aggregation and analysis system (central source computer) 318, and the databases may be part of one or more central systems. In some embodiments, one or more of the components of the system of FIG. 3 may be combined and/or the functionality of a functionality of a component may be divided between multiple components. For example, the content management system 304 may also perform the functionality of the content scheduler 308.

Figure 4:
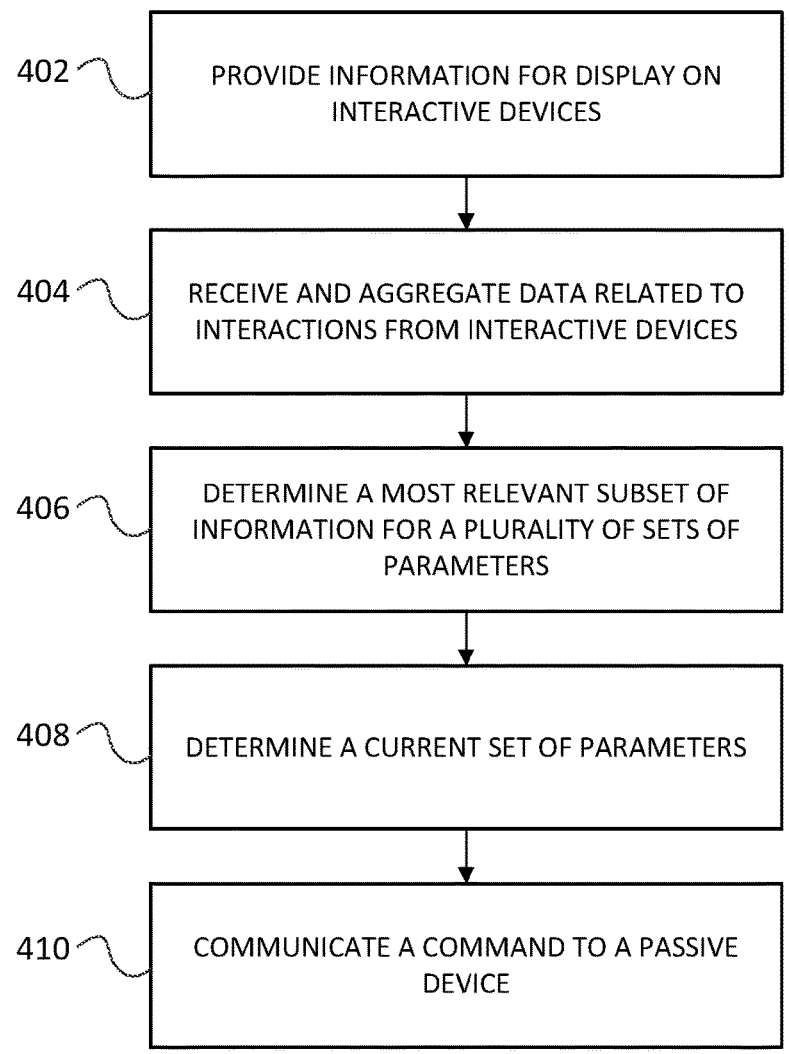
FIG. 4 is a flowchart depicting a process for updating a didactic information display according to embodiments.

FIG. 4 depicts a flowchart of one embodiment of a process 400 for updating a didactic information display. Process may be performed by a back-end server of a transit system, such as central source 206 described above. Aspects of process 400 may utilize the systems described in FIGS. 1-3. Process 400 may begin by the server providing information for display on a number of interactive information devices at block 402. For example, an initial configuration may be provided to an interactive display device and/or passive display device. Oftentimes, this initial information may be manually programmed as a starting set of information for display on a user interface of an interactive information device, such as a vending machine, information kiosk, and/or other interactive device. In some embodiments, the interactive information device may be a user device, such as a mobile device or personal computer that accesses a transit system website and/or mobile application. Interactions, such as screen touches, gaze tracking, audible commands, keystrokes, and/or other interactions may be monitored and associated with parameters of the device. For example, GPS data from a mobile device, along with a time/date stamp, and/or other parameters of the mobile device may be associated with each of the logged interactions. At block 404, data related to interactions from a number of users of the number interactive information devices may be received and aggregated. The data typically includes a location and a timestamp associated with each of the interactions, although other information, such as current weather, event information, disruption data, and the like may also be included. Each of the interactions may be related to a subset of the information displayed on one of the number of interactive information devices. At block 406, a most relevant subset of the information for a plurality of sets of parameters is identified or determined. A current set of parameters may be determined from the plurality of sets of parameters at block 408. A command may be communicated to a passive display device located remotely from the number of interactive information devices at block 410. The command may cause the passive display device to display the most relevant subset of the information based on the current set of parameters.

Figure 5:
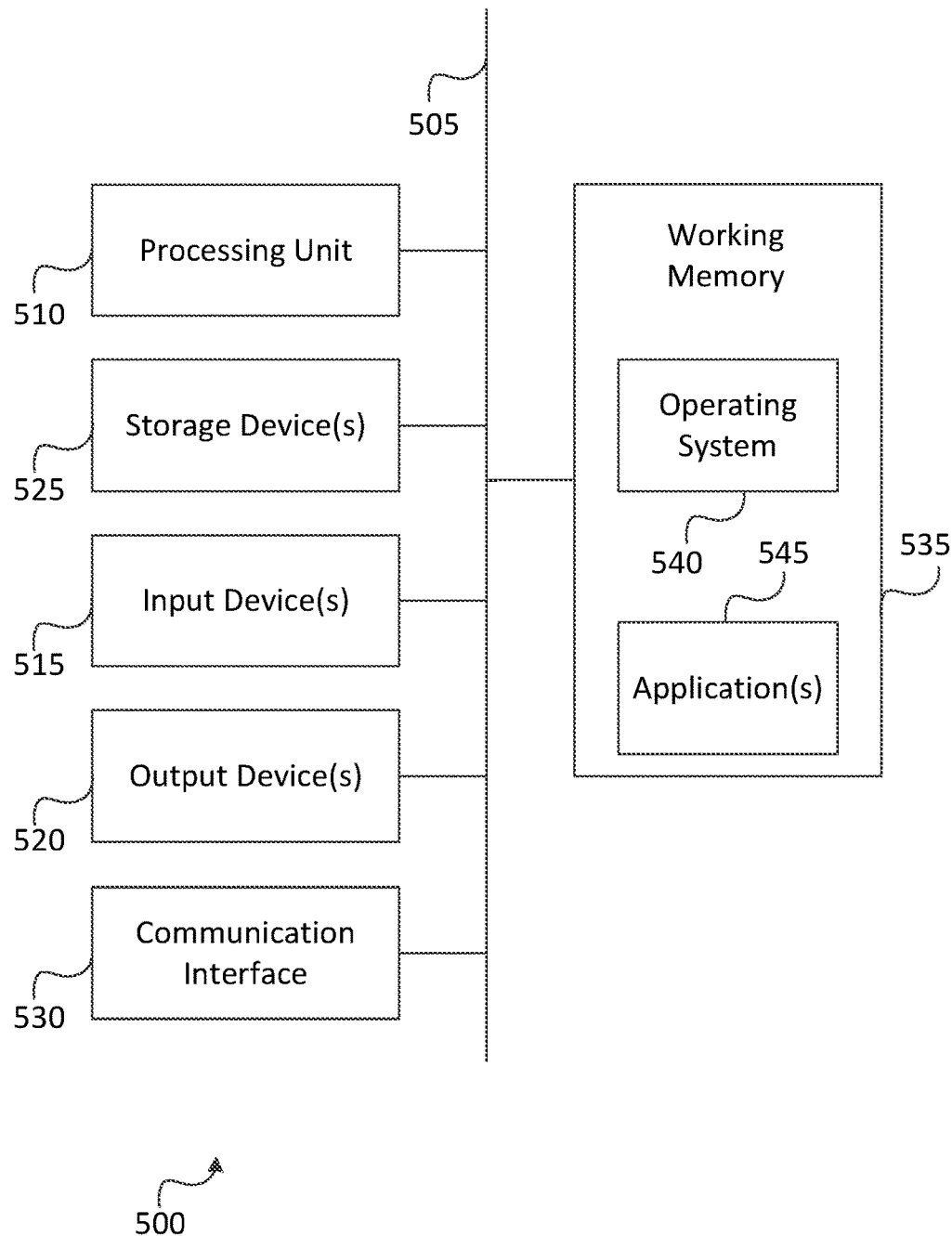
FIG. 5 depicts a computer system according to embodiments.

A computer system as illustrated in FIG. 5 may be incorporated as part of the previously described computerized devices. For example, computer system 500 can represent some of the components of the interactive information devices, passive display devices, central source, and other computer systems described herein. FIG. 5 provides a schematic illustration of one embodiment of a computer system 500 that can perform the methods provided by various other embodiments, as described herein. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more general-purpose processors and/or one or more special-purpose processors (such as digital signal processing chips, graphics acceleration processors, and/or the like); one or more input devices 515, which can include without limitation a keyboard, a touchscreen, receiver, a motion sensor, a camera, a smartcard reader, a contactless media reader, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a Wi-Fi device, a WiMax device, an NFC device, cellular communication facilities, etc.), and/or similar communication interfaces. The communication interface 530 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a general purpose computer (or other device) to a special purpose computer that is configured to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a non-transitory storage device 525 either before or after execution by the processing unit 510.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method of updating a didactic information display, the method comprising:
   providing information for display on a number of interactive information devices;
   receiving and aggregating data related to interactions from users of the number interactive information devices, the data comprising a location and a timestamp associated with each of the interactions, wherein each of the interactions is related to a subset of the information displayed on one of the number of interactive information devices;
   determining a most relevant subset of the information for a plurality of sets of parameters;
   determining a current set of parameters from the plurality of sets of parameters, wherein determining the current set of parameters comprises determining that a current time is within a predetermined time threshold of a departure time of a transit vehicle; and
   communicating a command to a passive display device located remotely from the number of interactive information devices, the command causing the passive display device to display the most relevant subset of the information based on the current set of parameters, wherein the command causes the passive display device to display a timetable of transit vehicle departures in response to the determination that the current time is within the predetermined time threshold of the departure time of the transit vehicle.

2. The method of updating a didactic information display of claim 1, wherein:
   the command comprising an order in which to cycle through and present the most relevant subset of the information on a display of the passive display device.

3. The method of updating a didactic information display of claim 1, wherein:
   the command comprises a display layout, the display layout determining a relative position for presenting the most relevant subset of the information on a display of the passive display device.

4. The method of updating a didactic information display of claim 1, wherein:
   the interactions comprise one or more of screen touch data, verbal commands, or user gaze tracking data.

5. The method of updating a didactic information display of claim 1, wherein:
   the data further comprises weather information;
   the current set of parameters comprises current weather information; and
   the most relevant subset of the information is based on the data having weather information that is the same as the current weather information.

6. The method of updating a didactic information display of claim 1, wherein:
   providing an additional command to the number of interactive information devices causes each of the number of interactive information devices to display the most relevant subset of the information.

7. A non-transitory computer-readable medium having instructions embedded thereon for updating a didactic information display, the instructions comprising computer code for causing a computing device to:
   provide information for display on a number of interactive information devices;
   receive and aggregate data related to interactions from users of the number interactive information devices, the data comprising a location and a timestamp associated with each of the interactions, wherein each of the interactions is related to a subset of the information displayed on one of the number of interactive information devices;
   determine a most relevant subset of the information for a plurality of sets of parameters;
   determine a current set of parameters from the plurality of sets of parameters, wherein determining the current set of parameters comprises determining that a current time is within a predetermined time threshold of a departure time of a transit vehicle; and
   communicate a command to a passive display device located remotely from the number of interactive information devices, the command causing the passive display device to display the most relevant subset of the information based on the current set of parameters, wherein the command causes the passive display device to display a timetable of transit vehicle departures in response to the determination that the current time is within the predetermined time threshold of the departure time of the transit vehicle.

8. The non-transitory computer-readable medium of claim 7, wherein:
   the information comprises one or more of text, images, video, real-time data, window sizes of various data, viewing duration of various data, a content flow, or interactive elements.

9. The non-transitory computer-readable medium of claim 7, wherein:
the command comprises a display layout, the display layout determining a relative position for presenting the most relevant subset of the information on a display of the passive display device.

10. The non-transitory computer-readable medium of claim 7, wherein:
the interactions comprise one or more of screen touch data, verbal commands, or user gaze tracking data.

11. The non-transitory computer-readable medium of claim 7, wherein:
the data further comprises weather information;
the current set of parameters comprises current weather information; and
the most relevant subset of the information is based on the data having weather information that is the same as the current weather information.

12. The non-transitory computer-readable medium of claim 7, wherein:
providing an additional command to the number of interactive information devices causes each of the number of interactive information devices to display the most relevant subset of the information.

13. A didactic information system, comprising:
a communications interface configured to communicate with a number of interactive information devices and at least one passive display device;
a memory; and
a processor configured to:
provide, using the communications interface, information for display on the number of interactive information devices;
receive and aggregate data related to interactions from users of the number interactive information devices, the data comprising a location and a timestamp associated with each of the interactions, wherein each of the interactions is related to a subset of the information displayed on one of the number of interactive information devices;
determine a most relevant subset of the information for a plurality of sets of parameters;
determine a current set of parameters from the plurality of sets of parameters, wherein determining the current set of parameters comprises determining that a current time is within a predetermined time threshold of a departure time of a transit vehicle; and
communicate, using the communications interface, a command to the at least one passive display device located remotely from the number of interactive information devices, the command causing the passive display device to display the most relevant subset of the information based on the current set of parameters, wherein the command causes the passive display device to display a timetable of transit vehicle departures in response to the determination that the current time is within the predetermined time threshold of the departure time of the transit vehicle.

14. The didactic information system of claim 13, wherein:
the information comprises one or more of text, images, video, real-time data, window sizes of various data, viewing duration of various data, a content flow, or interactive elements.

15. The didactic information system of claim 13, wherein:
the command comprises a display layout, the display layout determining a relative position for presenting the most relevant subset of the information on a display of the passive display device.

16. The didactic information system of claim 13, wherein:
the interactions comprise one or more of screen touch data, verbal commands, or user gaze tracking data.

17. The didactic information system of claim 13, wherein:
the data further comprises weather information;
the current set of parameters comprises current weather information; and
the most relevant subset of the information is based on the data having weather information that is the same as the current weather information.

\* \* \* \* \*